United States Patent
Foo et al.

(10) Patent No.: US 11,947,462 B1
(45) Date of Patent: Apr. 2, 2024

(54) CACHE FOOTPRINT MANAGEMENT

(71) Applicant: Apple Inc., Cupertino, CA (US)

(72) Inventors: Yoong Chert Foo, London (GB); Terence M. Potter, Austin, TX (US); Donald R. DeSota, Liberty Hill, TX (US); Benjiman L. Goodman, Cedar Park, CA (US); Aroun Demeure, London (GB); Cheng Li, Sunnyvale, CA (US); Winnie W. Yeung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 17/653,418

(22) Filed: Mar. 3, 2022

(51) Int. Cl.
   *G06F 12/08* (2016.01)
   *G06F 12/0875* (2016.01)

(52) U.S. Cl.
   CPC ...... *G06F 12/0875* (2013.01); *G06F 2212/60* (2013.01)

(58) Field of Classification Search
   None
   See application file for complete search history.

(56) References Cited

U.S. PATENT DOCUMENTS

| | | | | |
|---|---|---|---|---|
| 5,532,938 A | * | 7/1996 | Kondo | G06F 9/3885 708/524 |
| 9,223,709 B1 | * | 12/2015 | O'Bleness | G06F 12/0864 |
| 2006/0036810 A1 | * | 2/2006 | Accapadi | G06F 9/5027 711/132 |
| 2015/0149866 A1 | * | 5/2015 | Goodman | G06F 11/1016 714/768 |
| 2016/0378661 A1 | | 12/2016 | Gray et al. | |
| 2018/0276046 A1 | * | 9/2018 | Joao | G06F 12/084 |
| 2020/0043123 A1 | * | 2/2020 | Dash | G06F 9/4881 |
| 2021/0157739 A1 | | 5/2021 | Gholkar et al. | |
| 2021/0306679 A1 | * | 9/2021 | Rosewarne | H04N 19/134 |
| 2022/0308884 A1 | * | 9/2022 | Øygard | G06F 9/3836 |
| 2022/0391207 A1 | * | 12/2022 | Levenstein | G06F 12/0875 |

FOREIGN PATENT DOCUMENTS

WO 2019165428 A1 8/2019

\* cited by examiner

*Primary Examiner* — Tracy C Chan
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to cache footprint management. In some embodiments, execution circuitry is configured to perform operations for instructions from multiple threads in parallel. Cache circuitry may store information operated on by threads executed by the execution circuitry. Scheduling circuitry may arbitrate among threads to schedule threads for execution by the execution circuitry. Tracking circuitry may determine one or more performance metrics for the cache circuitry. Control circuitry may, based on the one or more performance metrics meeting a threshold, reduce a limit on a number of threads considered for arbitration by the scheduling circuitry, to control a footprint of information stored by the cache circuitry. Disclosed techniques may advantageously reduce or avoid cache thrashing for certain processor workloads.

20 Claims, 9 Drawing Sheets

|  | Current SIMD group target | | | |
|---|---|---|---|---|
| Metric value | Range A | ... | | Range M |
| Range A | Prog. Adj. | | | Prog. Adj. |
| Range B | Prog. Adj. | | | Prog. Adj. |
| ⋮ | ⋮ | | | ⋮ |
| Range N | Prog. Adj. | ... | | Prog. Adj. |

*FIG. 5*

| Cache metric | Execution utilization | Example Action |
|---|---|---|
| Low | Low | Increase target |
| Low | High | Hold target |
| High | Low | Lower target |
| High | High | Lower target aggressively |

*FIG. 6*

CACHE FOOTPRINT MANAGEMENT

BACKGROUND

Technical Field

This disclosure relates generally to computer processors and more particularly to controlling cache footprint.

Description of the Related Art

Cache thrashing is an undesirable phenomenon that may occur when the size of the data set being operated on is greater than the size of the cache. In this scenario, data may be repeatedly evicted to make room for other portions of the data set and then re-fetched into the cache for subsequent operations. Cache thrashing may substantially reduce processor performance and increase power consumption for a given processing task.

In the graphics processor context, a large number of shader pipelines may execute SIMD groups from a thread group. Out of a larger threadgroup of potentially thousands of threads that execute the same program, a scheduler may form and assign SIMD groups for execution on the shader hardware. A given GPU may support a maximum number of SIMD groups being in a particular processing state (e.g., eligible for arbitration to use execution channels) at a given time.

In the central processing unit (CPU) context, a given processor or processor core may execute multiple threads in parallel. A given processor or core may support a maximum number of threads being processed at least partially in parallel at a given time.

In some scenarios, certain combinations of threads or SIMD groups executing over a time interval may cause cache thrashing.

BRIEF DESCRIPTION OF THE DRAWINGS

FIG. 5 is a diagram illustrating an example programmable structure for thread target adjustments based on a current target and ranges of metric values, according to some embodiments.

FIG. 6 is a diagram illustrating an example structure for thread target adjustments based on a cache metric and utilization of execution circuitry, according to some embodiments.

DETAILED DESCRIPTION

In disclosed embodiments, control circuitry is configured to track cache performance metrics and control scheduling decisions based on the metrics (e.g., by controlling the number of threads considered for arbitration to be scheduled for execution). In the graphics context, the control circuitry may limit the number of SIMD groups concurrently executed (e.g., by limiting the number of SIMD groups considered for arbitration). Disclosed techniques may advantageously reduce or avoid cache thrashing by controlling the footprint of data operated on by arbitrated threads. Examples of cache metrics include evictions, occupancy, tag checks, hits/misses, etc. In some embodiments, the control circuitry also considers metrics for execution circuitry such as utilization.

Figure 2:
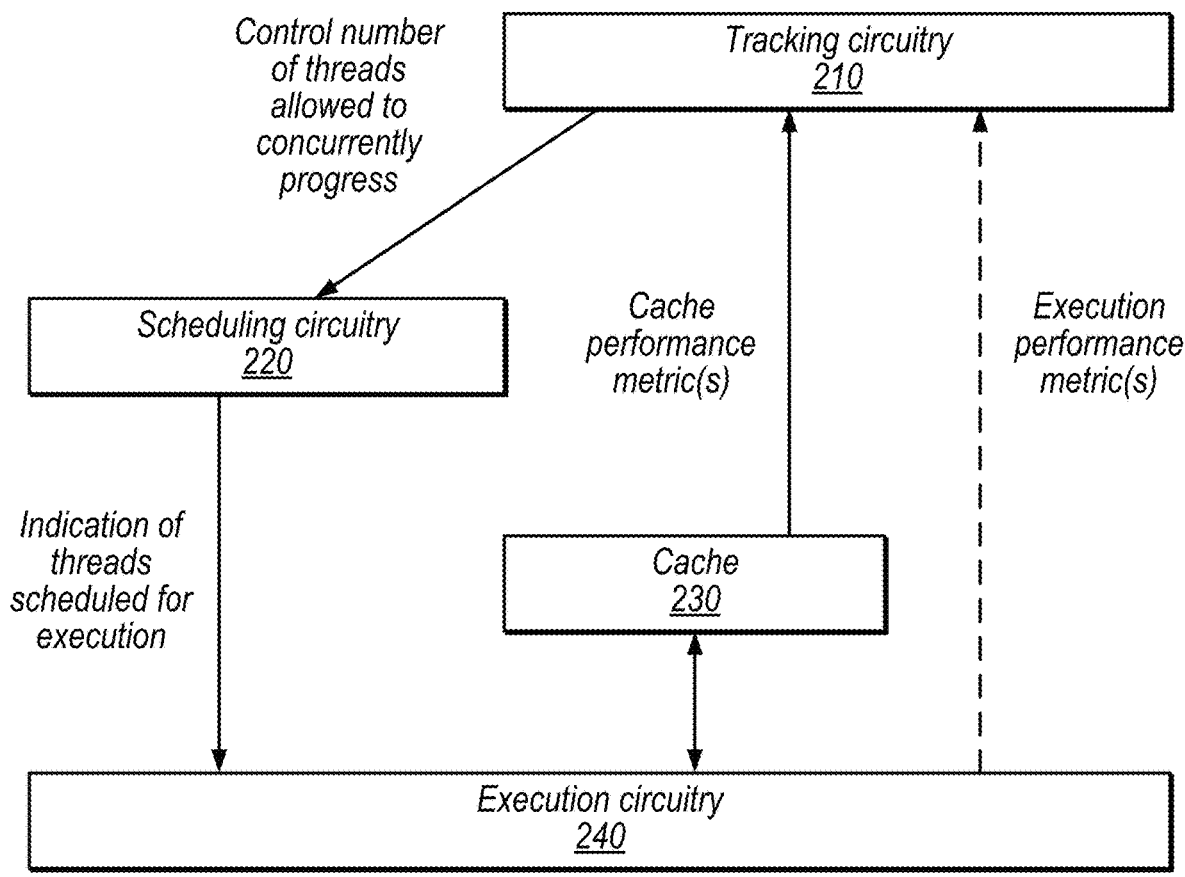
FIG. 2 is a block diagram illustrating example tracking and scheduling circuitry configured to perform cache footprint management, according to some embodiments.
Figure 3:
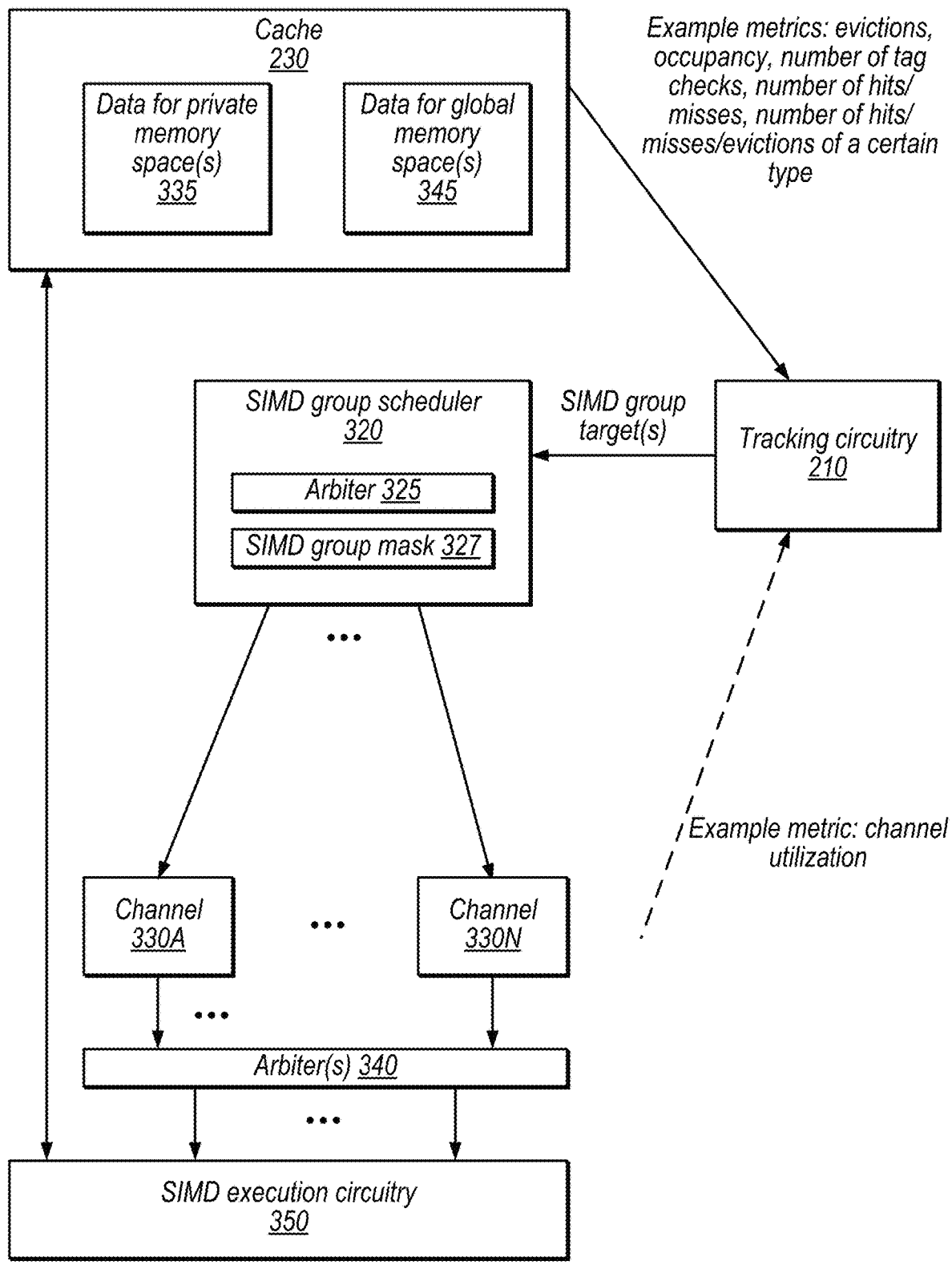
FIG. 3 is a block diagram illustrating a more detailed example of tracking and scheduling circuitry, according to some embodiments.
Figure 4:
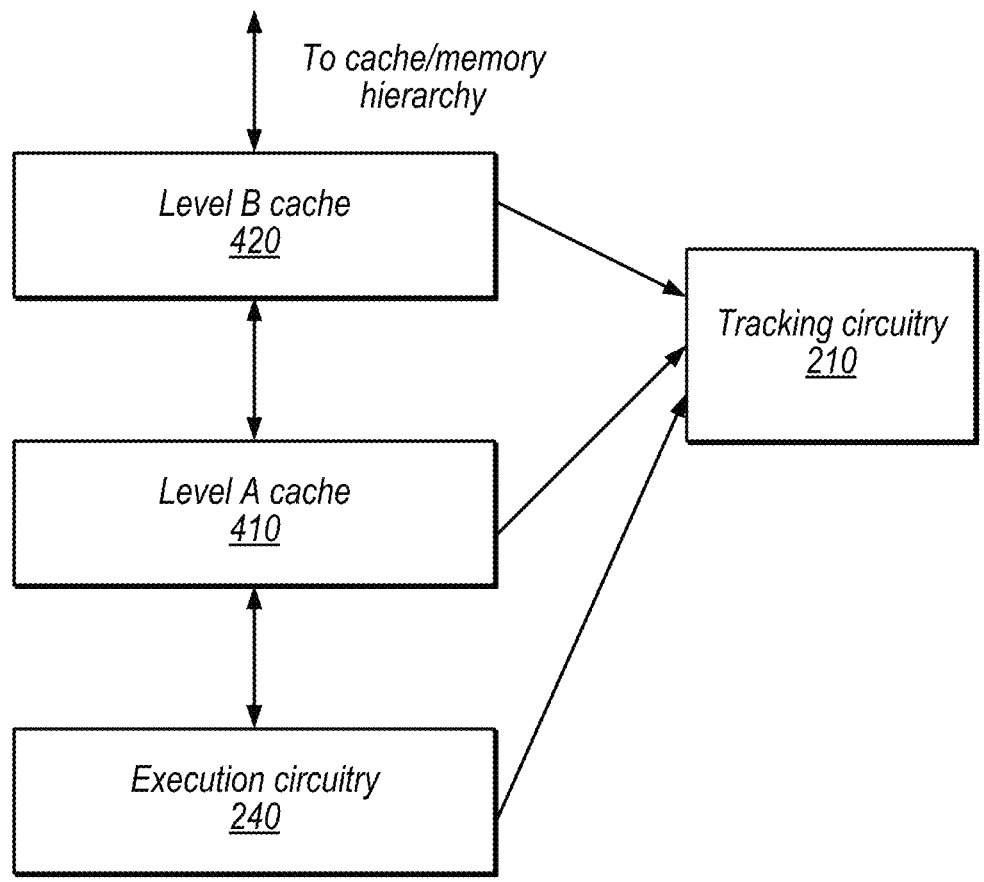
FIG. 4 is a block diagram illustrating tracking circuitry for multiple cache levels, according to some embodiments.

FIGS. 2 and 3 provide example tracking and scheduling circuitry configured to implement disclosed techniques. FIG. 4 provides an example embodiment that tracks metrics for multiple cache levels. FIGS. 5 and 6 provide example data structures used to determine the amount of adjustment to a thread limit, in some embodiments. The remaining figures show an example method, SoC, devices, and design information.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

Graphics Processing Overview

Figure 1A:
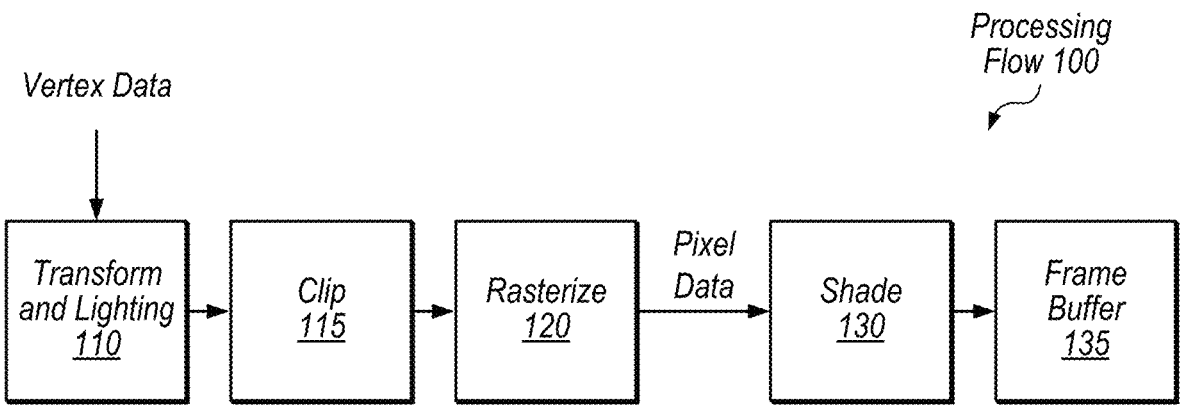
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
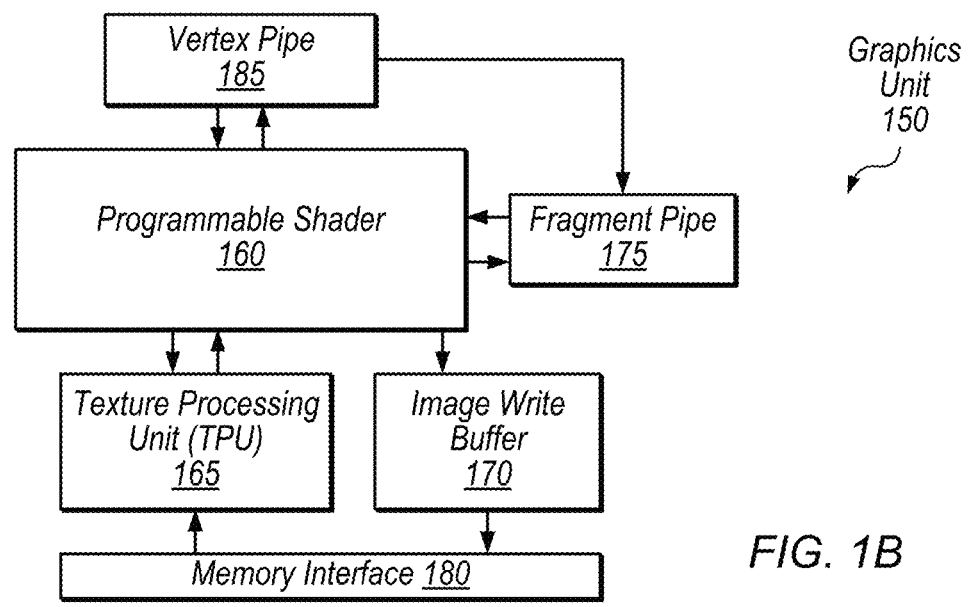
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2x2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Cache Metric Feedback for Scheduling

FIG. 2 is a block diagram illustrating example tracking and scheduling circuitry, according to some embodiments. In the illustrated embodiment, the processor includes tracking circuitry 210, scheduling circuitry 220, cache 230, and execution circuitry 240.

In some embodiments, the illustrated circuitry is included in programmable shader 160. In these embodiments, execution circuitry 240 may include SIMD execution circuitry, which may be configured to execute multiple SIMD groups in parallel. In CPU embodiments, the execution circuitry may include various units such as arithmetic logic units (ALUs) for integer operations, floating point operations, bit manipulation operations, etc. Generally, execution circuitry 240 may be pipelined and may use various thread processing techniques such as SIMD execution, multi-threading, etc.

Cache 230 may be a dedicated data cache or may be shared by instructions and data. Cache 230 may be one of multiple caches in a storage hierarchy. Cache 230 may be shared by multiple execution channels and multiple address spaces. In the illustrated embodiment, cache 230 provides one or more cache performance metrics to tracking circuitry 210. Specific examples of metrics are discussed in further detail below.

Tracking circuitry 210, in the illustrated embodiment, receives one or more performance metrics. Tracking circuitry 210 may aggregate metrics over different time windows. As shown, tracking circuitry 210 may also receive one or more execution performance metrics based on operations by execution circuitry 240, in some embodiments.

Based on the metric(s), tracking circuitry 210 is configured to provide feedback to scheduling circuitry 220. In the illustrated example, tracking circuitry 210 controls the number of threads allowed to concurrently progress. This limit may cause, over a given time window, a cache to see requests from a limited number of threads. As one example for limiting concurrent thread execution, tracking circuitry 210 may control a limit on the number of threads considered for arbitration by scheduling circuitry 220.

Scheduling circuitry 220, in the illustrated embodiment, is configured to arbitrate among ready threads to schedule threads for execution by execution circuitry 240. Scheduling circuitry 220 may use various appropriate algorithms to arbitrate, e.g., using priority-based selection. Based on the control signaling from tracking circuitry 210, scheduling circuitry 220 may limit the pool of threads considered for arbitration (e.g., for a limit of N threads, scheduling circuitry 220 may consider the N highest-priority threads for execution).

The disclosed techniques may advantageously reduce or avoid thrashing in cache 230, which may improve processor performance, reduce power consumption, or both.

More Detailed Example Scheduling Circuitry

FIG. 3 is a block diagram illustrating a more detailed example of tracking and scheduler circuitry, according to some embodiments. In particular, this example relates to SIMD execution and multi-channel datapath circuitry, although similar techniques may be used in embodiments that do not use those features.

In the illustrated embodiment, the processor includes tracking circuitry 210, SIMD group scheduler 320 (one example of scheduling circuitry 220), cache 230, channels 330A-330N, arbiter(s) 340, and SIMD execution circuitry 350.

Cache 230, in the illustrated embodiment, is configured to store data both for one or more private memory spaces (e.g., private GPU spaces) and data for one or more global memory spaces. In this context, cache footprint management may be particularly useful, due to the large number of possible combinations of workloads that may share the cache to store their data. In the GPU context, various memory scopes may be defined, e.g., at the overall shader level, kickslot level, tile level, for execution state, threadgroup level, SIMD group level, quad level, thread private memory, etc.

SIMD group scheduler 320, in the illustrated example, includes arbiter 325 which is configured to arbitrate among active SIMD groups. In some embodiments, thread group manager circuitry (not shown) is configured to supply SIMD groups to SIMD group scheduler, e.g., from active kicks. Arbiter 325 may include various logic configured to implement an arbitration algorithm and control multiplexer circuitry, for example, to select a SIMD group. SIMD group mask 327, in the illustrated embodiment, specifies the SIMD groups considered by arbiter 325. For example, if the SIMD group target specified by tracking circuitry 210 is N SIMD groups, SIMD group mask 327 may indicate the N highest-priority SIMD groups. In some embodiments, the SIMD group mask 327 is stored in a register. SIMD group scheduler 320 may be custom hardware or may be a coprocessor that executes GPU firmware, for example.

In some embodiments, tracking circuitry 210 is configured to provide separate SIMD groups targets for different types of work. In these embodiments, tracking circuitry 210 may track metrics at least partially separately for the different types of work. This may allow a reduction in the type of work that is currently contributing most to the cache footprint, for example. In some embodiments, the types of work may be delineated by the memory spaces that they are accessing. For example, different metrics may be maintained for threads that access thread private memory, threadgroup private memory, local image block memory, or other memory spaces such as device memory.

In some embodiments, tracking circuitry 210 is configured to control the number of SIMD groups concurrently executing over a time window by controlling the number of SIMD groups launched to SIMD group scheduler 320 (which in turn limits the number of SIMD groups available for arbitration).

In the illustrated example, datapath circuitry utilizes multiple channels 330. SIMD groups that win arbitration at arbiter 325 are assigned to a channel 330, and arbiter circuitry 340 is configured to arbitrate among the channels to provide access to SIMD execution circuitry 350. As one example, a channel 330 may include fetch and decode stages of an execution pipeline. Decoded instructions may wait to win arbitration before dispatching to SIMD execution circuitry. SIMD execution circuitry may include additional pipeline stages, including various ALU stages. SIMD execution circuitry may include multiple different types of units, e.g., integer, floating-point, shift, etc., that may be shared by multiple channels.

FIG. 3 also shows various example cache and execution metrics. In the illustrated example, an execution metric indicates channel utilization (e.g., the number of channels that have been assigned SIMD groups for execution). If the number of SIMD groups becomes too restricted, the occupancy may decrease which may be an inefficient use of execution circuitry. Generally, there may be a tradeoff between reducing cache thrashing and keeping execution units fed with work. In the illustrated example, multiple cache metrics are shown, which may be considered alone or in combination (where the combination may use various appropriate weights or logic to generate a SIMD group target based on multiple metrics). The evictions metric may indicate the number of evictions from cache 230 over one or more windows (where a window may correspond to a certain number of processor cycles, for example). The occupancy metric may indicate the number of cache sets (in a set associative cache) that are fully locked or fully dirty. A miss allocation for these sets may immediately trigger an eviction, so this metric may be predictive of potential evictions (and this metric may exhibit smaller lag time relative to measuring evictions directly). The number of tag checks, hits, misses, or some combination thereof may be maintained over one or more windows. As discussed above, tracking circuitry 210 may maintain various metrics separately for different types of work.

Example Multi-Level Cache Footprint Management

FIG. 4 is a block diagram illustrating example multi-level cache footprint management, according to some embodiments. In the illustrated example, the processor includes tracking circuitry 210, execution circuitry 240, level A cache 410, and level B cache 420. As shown, level A cache 410 is closer to the execution circuitry and level B cache 420 may communicate with a higher-level cache or memory in a hierarchy.

In some embodiments, tracking circuitry 210 is configured to consider metrics from both level A cache 410 and from level B cache 420 when controlling scheduling, e.g., to reduce or avoid thrashing at both cache levels. Tracking circuitry 210 may use different thresholds, metrics, adjustments, etc. for the different cache levels.

In some embodiments, tracking circuitry 210 is configured to independently consider metrics from different cache levels and generate multiple thread targets (e.g., SIMD group targets). In these embodiments, tracking circuitry 210 may select the thread target with the lowest number of threads to send to scheduling circuitry. In other embodiments, tracking circuitry 210 may consider metrics from multiple cache levels in combination to generate a single thread target for scheduling.

While two cache levels are shown in FIG. 4, similar techniques may be used using metrics from three or more cache levels. As shown, tracking circuitry 210 also may consider metrics for execution circuitry 240.

In some embodiments, tracking circuitry 210 is configured to consider an occupancy metric of the level A cache 410 and a channel utilization metric for execution circuitry 240 to generate one SIMD group target and is configured to consider an eviction count metric for level B cache 420 to generate another SIMD group target. Tracking circuitry 210 may then select the lower SIMD group target. In some embodiments, this may provide a balance between keeping execution circuitry busy and reducing cache thrashing (and this balance may be different at different cache levels, e.g., some thrashing may be more acceptable for level B cache 420 than for level A cache 410).

Considering an occupancy metric for level A cache 410 may be particularly useful because it does not have as much response lag as measuring evictions and may be particularly appropriate for lower-level caches, e.g., L0 caches that may store data for general purpose registers with volatile usage patterns, in the context of a unified memory architecture. In some embodiments occupancy is counted over a fixed window and the current occupancy is also considered, e.g., with weighting to filter out fluctuations while maintaining responsiveness. In some embodiments, the occupancy metric is also weighted based on channel utilization, which may further provide stability when utilization and occupancy vary substantially over time. In some embodiments, the utilization is also averaged over time to smooth out temporary fluctuations. In some embodiments, a dedicated counter is configured to count cycles in which utilization is below a low threshold, and this information may be used to rapidly increase the thread target in certain scenarios. In some embodiments, one or more hysteresis counters are implemented to control the rate at which the thread target can change.

FIG. 5 shows an example data structure used to adjust a SIMD group target (e.g., based on an eviction count for level B cache 420), according to some embodiments. In the illustrated example, there are programmable adjustment values for various ranges A-N of metric values and ranges A-M of the current SIMD group target. Graphics firmware may be configured to modify these adjustments. In other embodiments, adjustments may be hardcoded. Speaking generally, various adjustment parameters may be programmable, such as thresholds for triggering an adjustment, amount of adjustment for a given threshold, etc. In some embodiments, the metric value for FIG. 5 is evictions from level B cache 420 over a window corresponding to a certain number of cycles. In this example, a greater number of evictions may result in a greater reduction in the SIMD group target (e.g., to reduce thrashing) and vice versa.

FIG. 6 shows another example data structure used to adjust a SIMD group target (e.g., based on metrics from level A cache 410), according to some embodiments. In the illustrated example, an action is specified for different combinations of cache metric values (e.g., occupancy) and utilization of execution circuitry. In this example, low cache occupancy and low utilization results in increasing the SIMD group target. In this situation, thrashing may be unlikely and it may be desirable to use execution resources more efficiently. Low cache occupancy and high utilization results in an unchanged SIMD group target (this may be an ideal state from an efficiency standpoint). High cache occupancy and low execution utilization results in lowering the SIMD group target while high cache occupancy and high utilization results in lowering the SIMD group target aggressively (both of these situations may indicate impending cache thrashing).

In some embodiments, an initial thread target is also programmable, e.g., to start with a non-maximum target that may reduce thrashing for a workload that immediately begins accessing data with a large footprint.

Note that various numbers of thresholds for a given metric, combinations of metrics, combinations of metrics with current thread targets, etc. may be utilized to determine adjustments to the thread target. The disclosed examples are included for purposes of explanation but are not intended to limit the scope of the present disclosure.

Example Method

Figure 7:
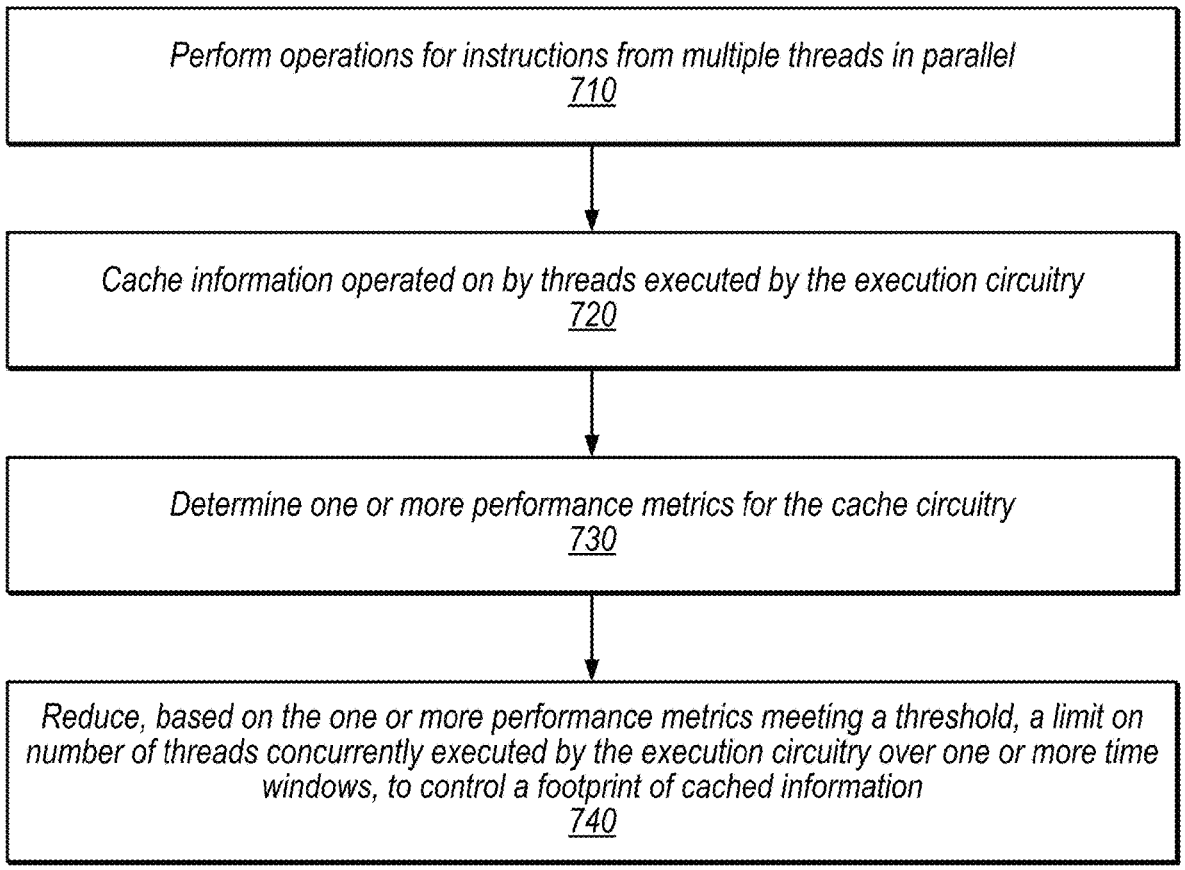
FIG. 7 is a flow diagram illustrating an example method, according to some embodiments.

FIG. 7 is a flow diagram illustrating an example method for managing cache footprint, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, execution circuitry of a computing device performs operations for instructions from multiple threads in parallel. The execution circuitry may include a number of pipelines configured to execute instructions. The parallel execution may be partial, e.g., some threads may execute for longer than others.

At 720, in the illustrated embodiment, the computing device caches (e.g., using cache 230) information operated on by threads executed by the execution circuitry. Over an interval in which multiple threads are executed that share a cache, the footprint of the data stored in the cache may vary, e.g., based on the workload being performed by different threads.

In some embodiments, the device arbitrates (e.g., using arbiter 325) among threads to schedule threads for execution by the execution circuitry.

At 730, in the illustrated embodiment, the device determines (e.g., using tracking circuitry 210) one or more performance metrics for the cache circuitry. The metrics may include, without limitation: an eviction metric that indicates a number of evictions from the cache circuitry, an occupancy metric that indicates a number of cache sets that are fully locked or dirty, a number of tag checks, a number of hits, and a number of misses. The metrics may include separate metrics for different categories of accesses (e.g., accesses to different memory spaces or from different types of agents). In these embodiments, control circuitry may control multiple limits on numbers of threads for different corresponding sets of threads that are requesting certain categories of accesses. The metrics may include metrics from multiple cache levels in a cache hierarchy. Tracking circuitry may generate separate limits on the number of threads considered for arbitration based on metrics from different caches and select a lowest limit to enforce. In other embodiments, metrics from different cache levels may be considered as input to generate scheduling control information, using various techniques.

At 740, in the illustrated embodiment, the device reduces (e.g., using SIMD group scheduler 320), based on the one or more performance metrics meeting a threshold, a limit on a number of threads concurrently executed by the execution circuitry over one or more time windows, to control a footprint of cached information stored by the cache circuitry. In some embodiments (e.g., in embodiments that allow more threads than execution resources) the device limits the number of threads considered for arbitration to limit the number of threads concurrently executed.

In some embodiments, the limit on the number of threads is adjusted based on one or more performance metrics for the execution circuitry, which may include a utilization metric, for example.

In some embodiments, the device is or includes a graphics processor, the execution circuitry includes shader processor circuitry configured to operate on SIMD groups of threads and the limit on the number of threads is a limit on SIMD groups considered for arbitration by the scheduling circuitry.

In some embodiments, the device includes programmable circuitry configured to specify one or more parameters for adjusting the limit on the number of threads considered for arbitration. These parameters may include thresholds for adjustment, amounts of adjustment for a given threshold, etc.

In some embodiments, the device is configured, based on one or more bypass indicators for one or more threads, to consider those threads in arbitration regardless of the limit on a number of threads. This may allow agents to bypass cache footprint management for certain workloads. Generally, this may allow indicated threads or SIMD groups to bypass the cache footprint management mechanism, e.g., for performance or efficiency reasons or to avoid deadlock.

In some embodiments, the device is configured to, based on an indication that a set of threads should synchronize, consider a greater number of threads than indicated by the limit for arbitration, based on one or more threads in the set of threads satisfying a priority threshold. The priority threshold may correspond to being one of the N highest-priority threads or SIMD groups ready for arbitration when N threads or SIMD groups are considered for arbitration. This may avoid deadlock synchronization situations, for example. More generally (e.g., in systems that do not necessarily select the N highest-priority threads), a processor may identify a set of threads that need to bypass cache footprint management to avoid deadlock and those threads may be eligible for arbitration regardless of whether they would normally have been considered under the current thread limit.

In some embodiments, the device is configured to weight a cache metric (e.g., occupancy) based on an execution metric (e.g., channel utilization). In some embodiments, the device is configured to average one or more metrics (e.g., cache occupancy) over time. In some embodiments, the device controls the limit on a number of threads considered for arbitration by restricting the number of threads launched into thread scheduling circuitry (e.g., SIMD group scheduler 320).

In some embodiments, the device is configured to provide an initial limit on a number of threads considered for arbitration for a given workload (e.g., by starting small for a render pass or kickslot) which may advantageously reduce or avoid thrashing if the workload begins with a large data fetch.

In some embodiments, the device may be configured to arbitrate among threads for assignment to a number of different channels implemented by the apparatus and also configured to arbitrate among channels that share execution circuitry.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that is indicates a mapping between the kick's virtual addresses and physical addresses. In some embodiments, the graphics driver starts a persistent mapping thread for each kickslot via a configuration register, and starts the persistent mapping thread prior to starting the kick via a configuration register. In some embodiments, a mapping thread may persist across multiple kicks in a kickslot, e.g., if the kicks have the same context ID.

Example Device

Figure 8:
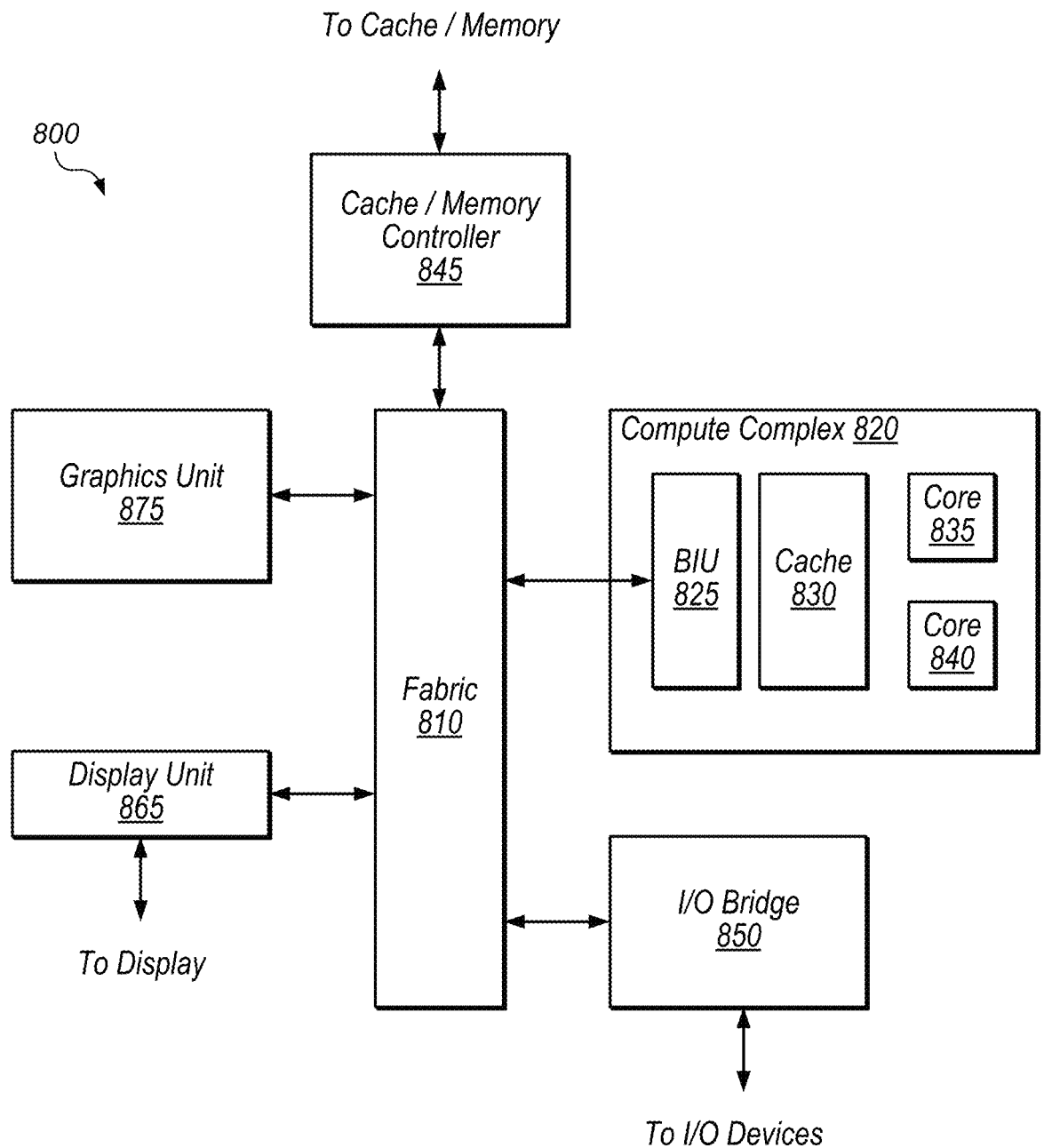
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

While some of the disclosed embodiments involve graphics processors and SIMD processing, the disclosed techniques may also be implemented by compute complex 820 for individual threads, SIMD groups, or both. Disclosed techniques may reduce thrashing in cache 830, for example, or one or more internal caches of a core, which may improve performance, reduce power consumption, or both, relative to traditional techniques.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques are implemented in graphics unit 875, which may be configured similarly to graphics unit 150. Disclosed techniques may advantageously reduce cache thrashing which may improve performance, reduce power consumption, or both, relative to traditional techniques.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
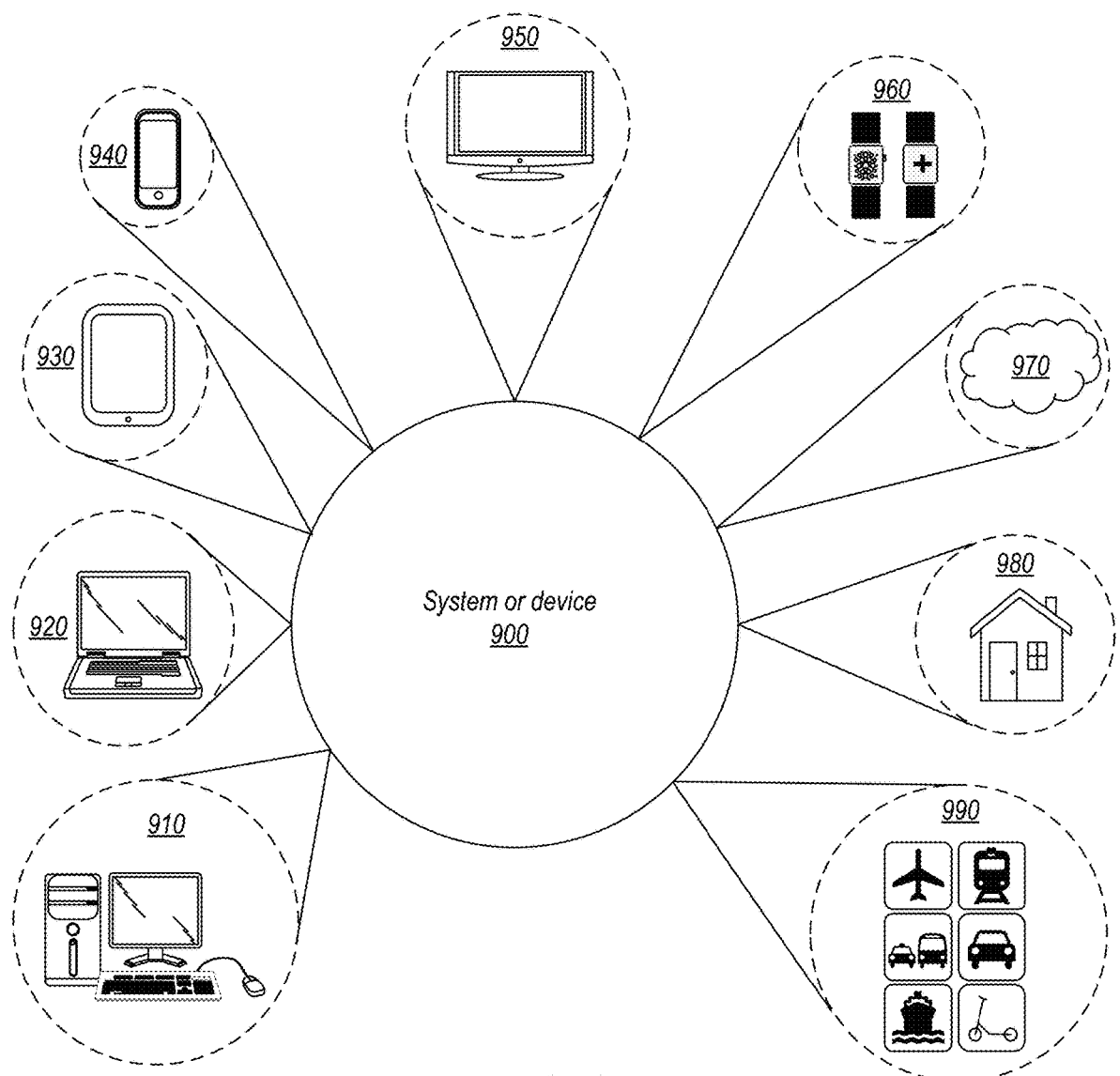
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
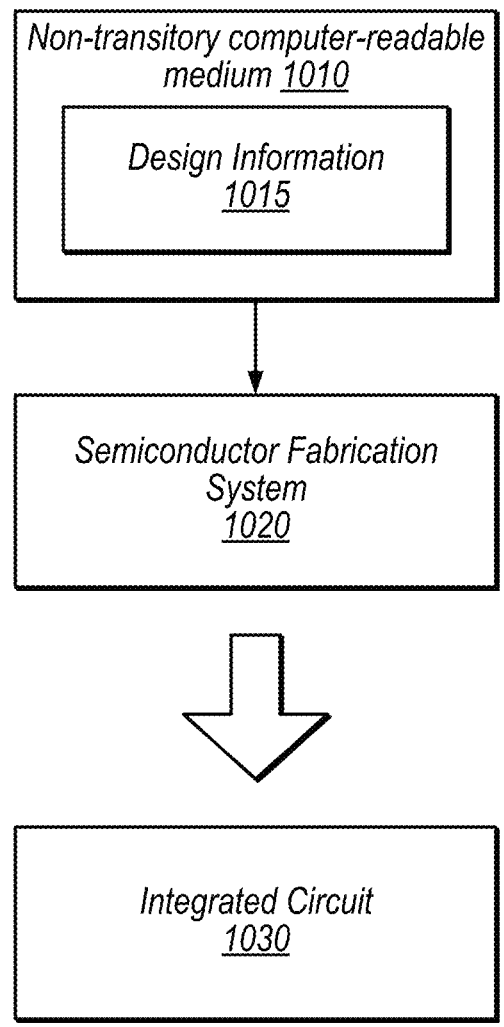
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1B, and 2-4. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations.

It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   execution circuitry configured to perform operations for instructions from multiple threads in parallel;
   cache circuitry configured to store information operated on by threads executed by the execution circuitry;
   tracking circuitry configured to determine one or more performance metrics for the cache circuitry; and
   control circuitry configured to:
   based on the one or more performance metrics meeting a threshold, reduce a limit on a number of threads concurrently executed by the execution circuitry over one or more time windows, to control a footprint of information stored by the cache circuitry; and based on a bypass indicator for a thread, consider the thread for scheduling regardless of the limit on the number of threads, wherein the consideration allows the number of threads concurrently executed to exceed the limit on the number of threads during a portion of execution of the thread.

2. The apparatus of claim 1, further comprising:
scheduling circuitry configured to arbitrate among threads to schedule threads for execution by the execution circuitry;
wherein, to reduce the limit on the number of threads concurrently executed, the control circuitry is configured to limit the number of threads considered for arbitration by the scheduling circuitry.

3. The apparatus of claim 1, wherein:
the apparatus is a graphics processor;
the execution circuitry includes shader processor circuitry configured to operate on single-instruction multiple-data (SIMD) groups of threads; and
the limit on the number of threads is a limit on SIMD groups.

4. The apparatus of claim 1, wherein:
the tracking circuitry is further configured to determine one or more performance metrics for the execution circuitry; and
the control circuitry is configured to adjust the limit on the number of threads based on the one or more performance metrics for the execution circuitry.

5. The apparatus of claim 4, wherein the one or more performance metrics for the execution circuitry include a utilization metric.

6. The apparatus of claim 1, wherein the one or more performance metrics for the cache circuitry include an eviction metric that indicates a number of evictions from the cache circuitry.

7. The apparatus of claim 1, wherein the one or more performance metrics for the cache circuitry include an occupancy metric that indicates a number of cache sets that are fully locked or dirty.

8. The apparatus of claim 1, wherein the one or more performance metrics for the cache circuitry include at least one of the following metrics:
a number of tag checks;
a number of hits; and
a number of misses.

9. The apparatus of claim 8, wherein the one or more performance metrics include separate metrics for different categories of accesses and wherein the control circuitry is configured to control multiple limits on numbers of threads for different corresponding sets of threads that are requesting certain categories of accesses.

10. The apparatus of claim 1, wherein the one or more performance metrics include metrics from multiple cache levels in a cache hierarchy and wherein the tracking circuitry is configured to generate separate limits on the number of threads considered for arbitration based on metrics from different caches and select a lowest limit to enforce.

11. The apparatus of claim 1, wherein the control circuitry is programmable to specify one or more parameters for adjusting the limit on the number of threads considered for arbitration.

12. The apparatus of claim 1, further comprising:
scheduling circuitry configured to arbitrate among threads to schedule threads for execution by the execution circuitry and select threads based on thread priority;
wherein to reduce the limit on the number of threads concurrently executed, the control circuitry is configured to limit the number of threads considered for arbitration by the scheduling circuitry; and
wherein the control circuitry is further configured to, based on an indication that a set of threads should synchronize, consider a greater number of threads than indicated by the limit for arbitration, based on one or more threads in the set of threads satisfying a thread priority threshold.

13. A method, comprising:
performing, by execution circuitry of a computing device, operations for instructions from multiple threads in parallel;
caching, by the computing device in a cache, information operated on by threads executed by the execution circuitry;
arbitrating, by the computing device, among threads to schedule threads for execution by the execution circuitry;
determining, by the computing device, one or more performance metrics for the cache;
reducing, by the computing device based on the one or more performance metrics meeting a threshold, a limit on a number of threads considered for arbitration, to control a footprint of cached information; and
based on a bypass indicator for a thread, the computing device considering the thread for scheduling regardless of the limit on the number of threads, wherein the considering allows the number of threads concurrently executed to exceed the reduced limit on the number of threads during a portion of execution of the thread.

14. The method of claim 13, further comprising:
determining, by the computing device, one or more performance metrics for the execution circuitry, wherein the reducing is based on the one or more performance metrics for the execution circuitry.

15. The method of claim 13, wherein the one or more performance metrics for the cache include an eviction metric that indicates a number of evictions from the cache.

16. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
execution circuitry configured to perform operations for instructions from multiple threads in parallel;
cache circuitry configured to store information operated on by threads executed by the execution circuitry;
tracking circuitry configured to determine one or more performance metrics for the cache circuitry; and
control circuitry configured to:
based on the one or more performance metrics meeting a threshold, reduce a limit on a number of threads concurrently executed by the execution circuitry over one or more time windows, to control a footprint of information stored by the cache circuitry; and
based on a bypass indicator for a thread, consider the thread for scheduling regardless of the limit on the number of threads, wherein the consideration allows the number of threads concurrently executed to exceed the limit on the number of threads during a portion of execution of the thread.

17. The non-transitory computer readable storage medium of claim 16, wherein:
   the tracking circuitry is further configured to determine one or more performance metrics for the execution circuitry; and
   the control circuitry is configured to adjust the limit on the number of threads based on the one or more performance metrics for the execution circuitry.

18. The non-transitory computer readable storage medium of claim 16, wherein the one or more performance metrics for the cache circuitry include an occupancy metric that indicates a number of cache sets that are fully locked or dirty.

19. The non-transitory computer readable storage medium of claim 16, wherein the one or more performance metrics for the cache circuitry include an eviction metric that indicates a number of evictions from the cache circuitry.

20. An apparatus, comprising:
   execution circuitry configured to perform operations for instructions from multiple threads in parallel;
   scheduling circuitry configured to arbitrate among threads to schedule threads for execution by the execution circuitry and select threads based on thread priority;
   cache circuitry configured to store information operated on by threads executed by the execution circuitry;
   tracking circuitry configured to determine one or more performance metrics for the cache circuitry; and
   control circuitry configured to:
      based on the one or more performance metrics meeting a threshold, reduce a limit on a number of threads concurrently executed by the execution circuitry over one or more time windows, to control a footprint of information stored by the cache circuitry, wherein, to reduce the limit on the number of threads concurrently executed, the control circuitry is configured to limit the number of threads considered for arbitration by the scheduling circuitry; and
      based on an indication that a set of threads should synchronize, consider a greater number of threads than indicated by the limit for arbitration, based on one or more threads in the set of threads having a thread priority that meets a priority threshold.

* * * * *